United States Patent [19]

Flies

[11] 4,379,966

[45] Apr. 12, 1983

[54] RECEPTACLE FOR ELECTRONIC INFORMATION KEY

[75] Inventor: William P. Flies, Burnsville, Minn.

[73] Assignee: Datakey, Inc., Burnsville, Minn.

[21] Appl. No.: 286,362

[22] Filed: Jul. 23, 1981

[51] Int. Cl.[3] .............................................. G06K 7/06

[52] U.S. Cl. .................................... 235/443; 235/384; 235/487; 340/825.31

[58] Field of Search ....................... 235/443, 384, 487; 340/825.31; 70/283

[56] References Cited

U.S. PATENT DOCUMENTS

| | | | |
|---|---|---|---|
| 3,686,659 | 8/1972 | Bostrom | 340/825.31 X |
| 3,761,892 | 9/1973 | Bosnyak | 340/825.31 X |
| 3,842,629 | 10/1974 | Pazer | 70/264 |
| 3,889,501 | 6/1975 | Fort | 70/283 |
| 4,297,569 | 10/1981 | Flies | 235/443 |

FOREIGN PATENT DOCUMENTS

| | | | |
|---|---|---|---|
| 1321529 | 12/1963 | France | 340/825.31 |
| 2146802 | 2/1973 | France | 340/825.31 |
| 2363837 | 9/1976 | France | 340/825.31 |

*Primary Examiner*—Harold I. Pitts

*Attorney, Agent, or Firm*—Schroeder, Siegfried, Vidas, Steffey & Arrett

[57] ABSTRACT

Receptacle for a key-like device containing an embedded micro-electronic circuit component with leads thereto extending to the surface of the key. The receptacle defines a keyway in which a plurality of contact heads spaced to correspond to the spacing of the leads on the key are positioned. The contact heads are supported by finger-like spring members which provide inwardly directed pressure against the contact heads when the key leads are brought into engagement with the contact heads. A flexible circuit surrounding the finger spring members and connected to the receptacle contact heads provides means for connecting the microelectronic circuit in the key with a control circuit such as a computer.

11 Claims, 13 Drawing Figures

RECEPTACLE FOR ELECTRONIC INFORMATION KEY

BACKGROUND OF THE INVENTION

This invention relates to improvements in the functional design of electrical receptacles for use in combination with electrical key-like devices. The invention is an improvement over the inventions of the copending applications, Ser. No. 52,773, filed June 28, 1979 and Ser. No. 163,307 filed June 26, 1980. The disclosures of said respective applications are incorporated herein by reference.

Electrical devices of various types have been proposed in which a master circuit or electrical operating system of some kind, such as a computer system, is activated by use of a portable device that is combined with the electrical system, or by insertion into a slot or the like to make electrical contact or connection with the system. This invention is concerned broadly with such portable devices and with such systems. However, it is specifically concerned with a receptacle for receiving electrical key-like devices that carry data in the form of a microelectronic circuit component or chip and providing electrical connection between such component and a computer or other operating electrical circuit. Such key-like devices and receptacles therefor have been described in detail in copending applications Ser. No. 52,773, filed June 28, 1979 and Ser. No. 163,307, filed June 26, 1980. The key-like devices of the aforementioned applications can retain relatively large amounts of data bits (information) in a portable medium with a small size. Very fast data access and data transfer rates (times) are provided by electrical connection of such devices to a computer i.e., an electrical circuit means including a program memory and a processor, by means of specially designed receptacles therefor. It is desirable that the receptacles have a design which provides good electrical contact with the computer even after prolonged usage.

BRIEF SUMMARY OF THE INVENTION

The present invention relates to an improvement on the receptacle of copending applications Ser. No. 52,773, and Ser. No. 163,307. The improvements relate to functional design features of the receptacle which improve the manufacturability of the device, improve the cooperation between the key and the receptacle, decrease the likelihood of physical damage to the receptacle and diminish or eliminate problems created by static electricity. A particular feature of the invention is the provision in the receptacle of a cylinder-like structure surrounding keyway including a plurality of opposing pairs of finger-like spring members the ends of which engage and support receptacle contact heads protruding into the keyway. Upon rotation of the key into a locked position the contact heads and supporting finger spring pairs are displaced radially outwardly. The finger springs supply inwardly directed pressure to the receptacle contact heads to assure a secure electrical contact between the key contacts and the receptacle contact heads.

A further feature of the invention is the provision of spaced detents on a finger spring set, which detents protrude into the keyway further than the keyway contacts. The detents serve as locking means for the key and also may aid in guiding the key during insertion into the receptacle.

The receptacle contact heads are secured (eg., soldered or staked) to a flexible circuit member which partially surrounds the keyway between the finger spring members and the outer wall of the receptacle. The circuit is flexible so that it may move with the contact heads when the key is rotated into and out of the locked position. A narrow portion of the flexible circuit which is conveyed out of the receptacle by means of a slit in the rear thereof provides means to connect the key to an external operating electrical circuit such as a computer or other control circuit. Depending on the complexity of the control circuit or computer, such circuit or computer may be alternatively connected to the printed circuit within the body of the receptacle. In such case the only electrical lines leading into the receptacle would be those necessary to provide power to and output from the computer or other control circuit.

To reduce or eliminate static electricity on the surfaces of the key-like device, the receptacle may be provided with one or more fine wire brush members extending into the keyway so as to contact the key side surfaces during insertion thereof. Such brushes may be connected to ground via the flexible printed circuit.

DETAILED DESCRIPTION OF THE INVENTION

Figure 1:
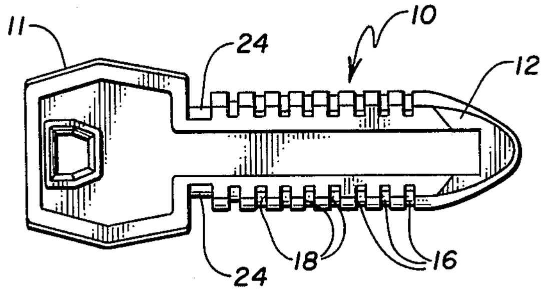
FIG. 1 is a side elevation of a key-like device as disclosed in application Ser. No. 163,307.

In FIG. 1 there is shown a portable random access data device or key generally designated 10. Key 10 comprises non-conductive head and insert body portions 11 and 12 respectively. The insert body portion 12 contains an integrated circuit or chip embedded therein. Leads 16 of the chip extend from the chip through the body portion of the key to the upper and lower surfaces thereof where they are bent to lie within spaced contact grooves 18.

Figure 2:
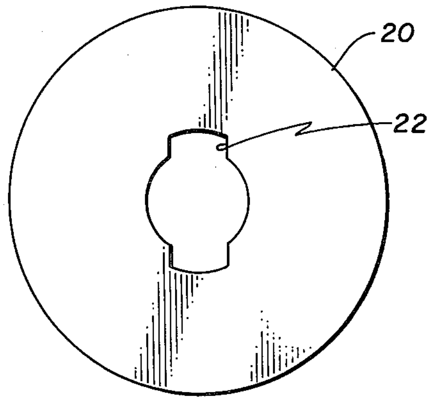
FIG. 2 is a keyhole end elevation of the receptacle of the present invention.
Figure 3:
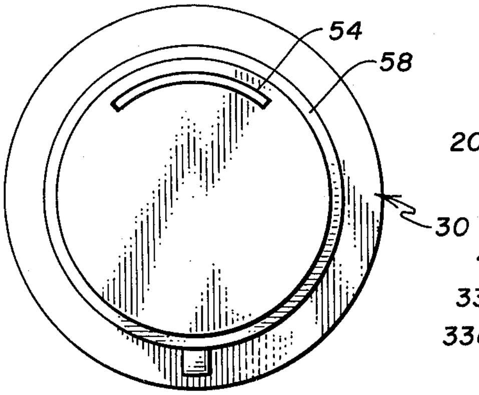
FIG. 3 is a rear end elevation of the receptacle of the present invention.

As shown in FIG. 2, front 20 of the receptacle has a keyway opening 22. Opening 22 is a compound shape comprising a generally rectangular slot which permits insertion of the key insert portion 12 into the receptacle and a generally circular central expansion area the diameter of which corresponds generally to the thickness of the key between grooves 24 located adjacent head portion 11 of the key. The shape of the keyway opening 22 cooperates with grooves 24 so that the key may not be rotated until it is fully inserted. Additionally, once rotation has begun the key may not be removed until it is returned to the insertion position.

Figure 7:
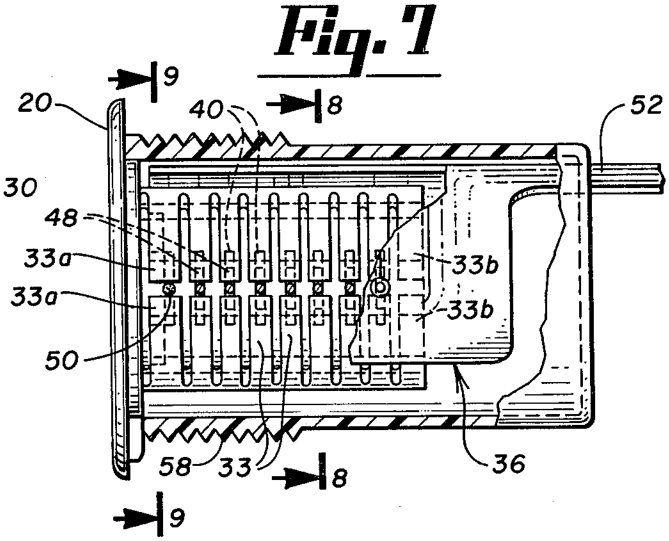
FIG. 7 is a side plan view of the receptacle of the invention with parts cutaway.
Figure 4:
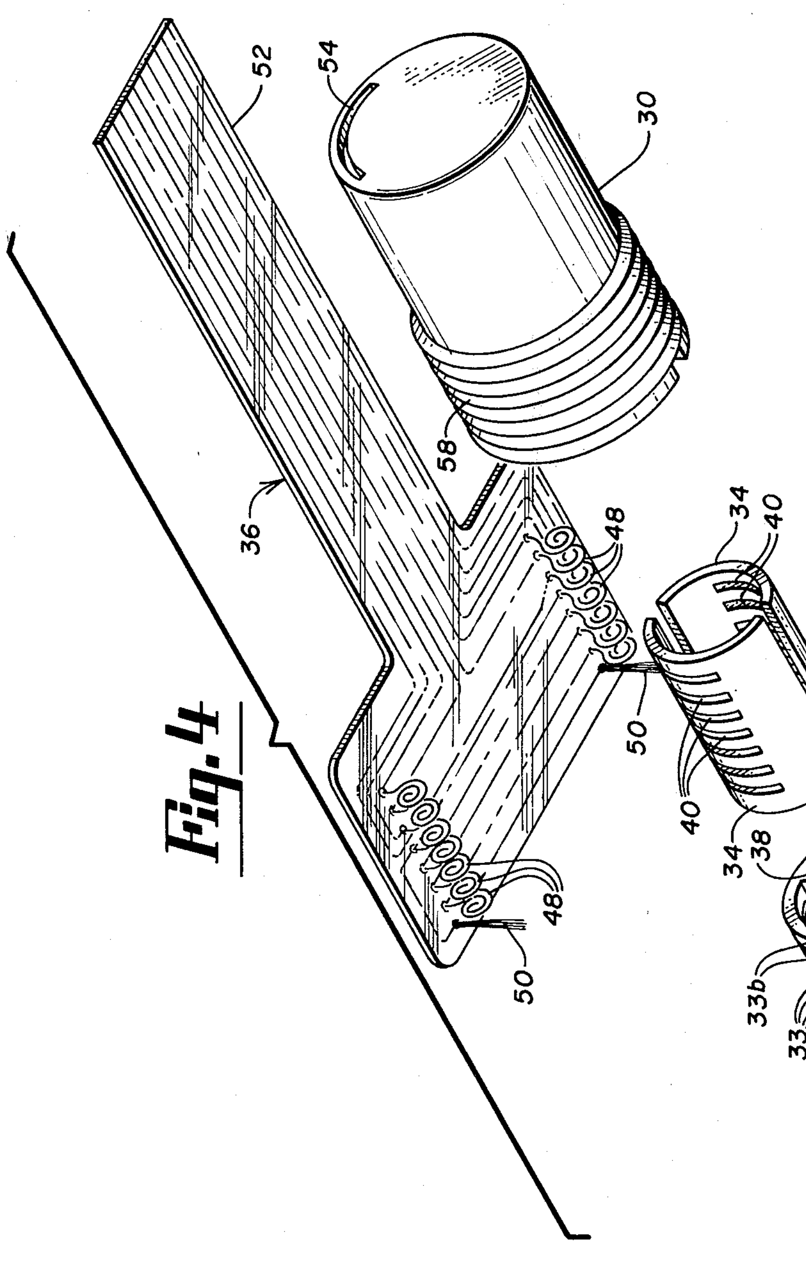
FIG. 4 is an exploded pictorial view of the receptacle of the present invention.
Figure 4:
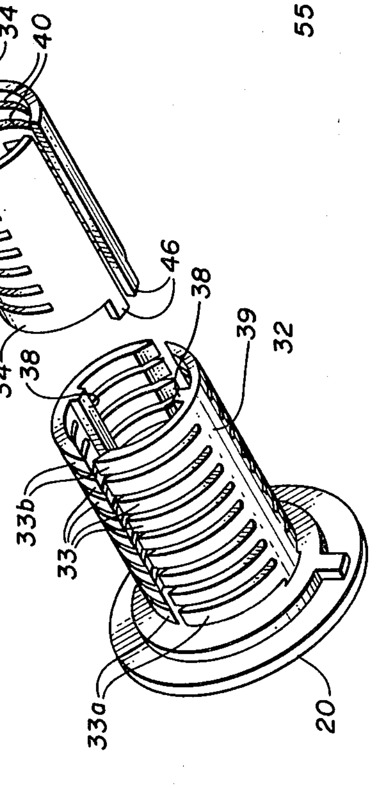

The inventive receptacle structure to which the present application is directed is best shown in FIGS. 4 and 7. The receptacle is a multi-part assembly which includes outer body member 30, and inner finger spring cylinder means 32 of finger-like spring members 33 and spine portions 39. The cylinder 32 is preferably integrally molded to the front face 22 of the receptacle. Semi-cylindrical insert members 34 and flexible circuit member 36 are also included in the receptacle assembly. Body member 30, inner cylinder 32 and inserts 34 are preferably made from an electrically insulating material. Acetal copolymer, which has an excellent modulus of elasticity is an especially advantageous material for cylinder 32.

Figure 8:
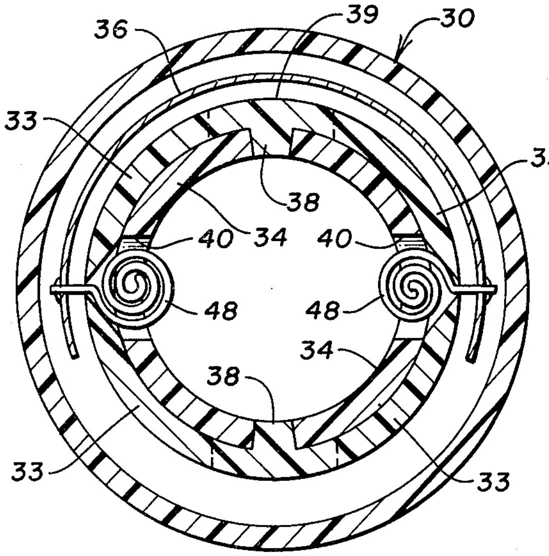
FIG. 8 is a sectional view of the receptacle taken along line 8—8 of FIG. 7.

The insert members 34 fit inside cylinder 32 between alignment ridges 38. As shown in FIG. 8, the interior surfaces of members 34, together with the exposed upper surface of ridges 38, form the keyway of the receptacle. Ridges 38 also serve to provide a reinforcement for the spine portions 39 which connect the plurality of finger members 33 so as to form cylinder 32.

The keyway insert members 34 contain a plurality of transverse slots 40 therethrough. In the assembled receptacle the slots are centered on opposing finger pairs as shown in FIGS. 7 and 8.

Figure 9:
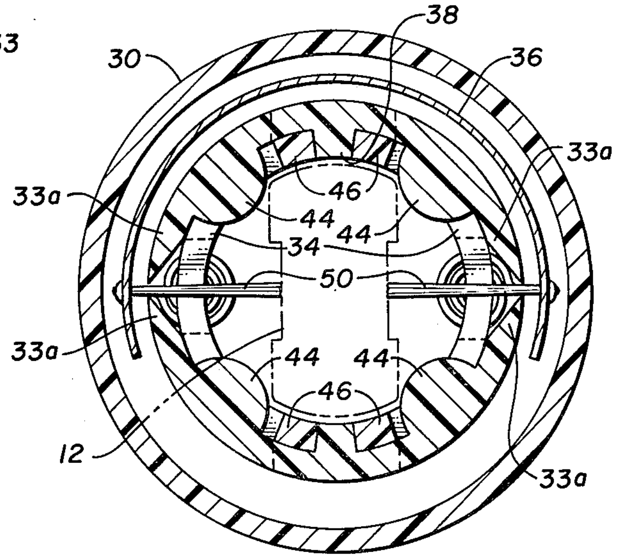
FIG. 9 is a sectional view of the receptacle taken along line 9—9 of FIG. 7, with a key inserted.
Figure 5:
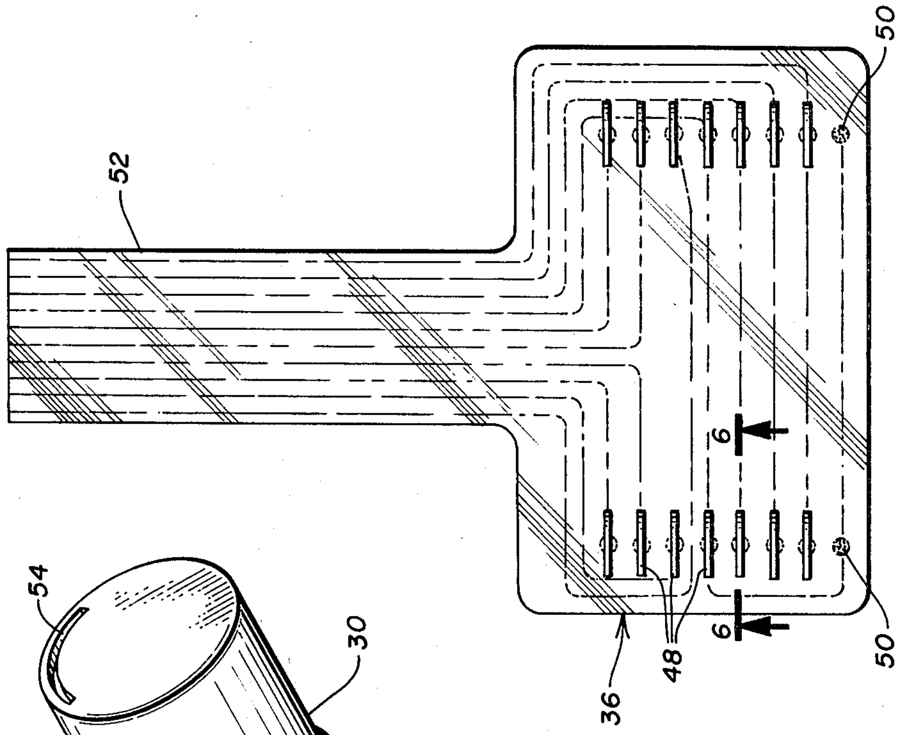
FIG. 5 is a plan view of the flexible circuit with receptacle contacts soldered thereto.
Figure 11:
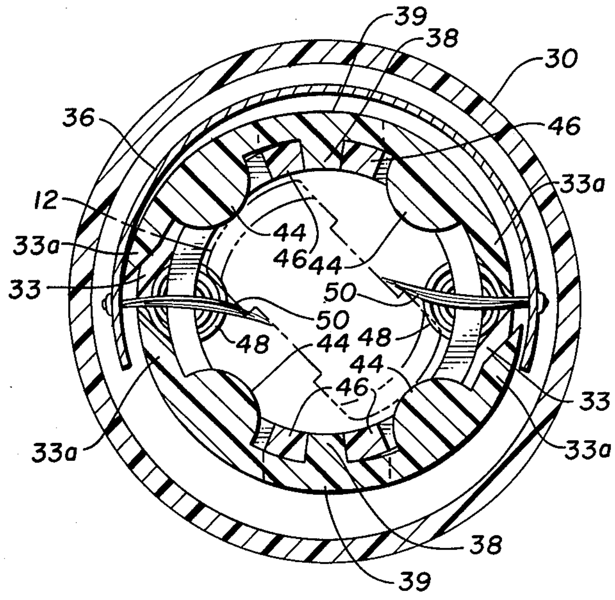
FIG. 11 is a view as in FIG. 9 but with the key partly rotated to engage the keyway detents.
Figure 12:
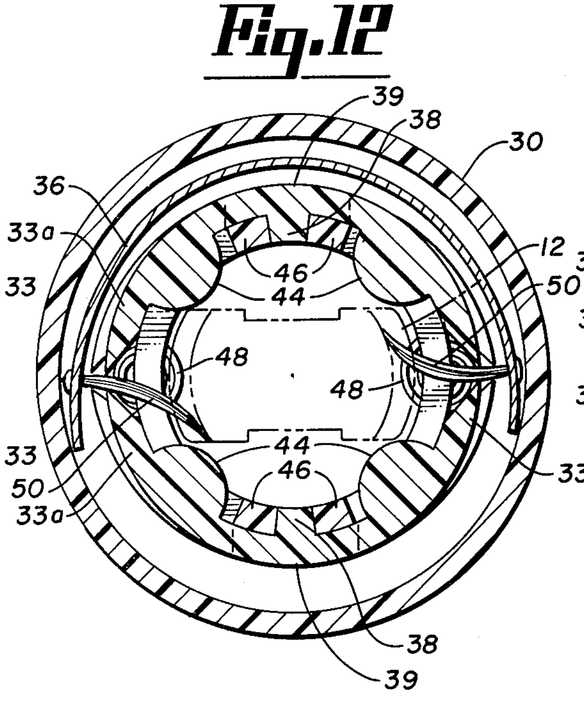
FIG. 12 is a view as in FIGS. 9 and 11 but with the key fully rotated to the locked position.

As shown in FIGS. 9, 11, and 12, fingers 33*a*, the foremost set of fingers, each contain a protrusion or detent 44 in a central portion thereof which serves as means for holding the key either in an insert position angularly displaced from the receptacle contact leads or in a locked position in contact with the receptacle contact heads. In order to accommodate these detents the foremost portion of insert members 34 are cut away except for protrusions 46 at the upper and lower extremities thereof.

Partially surrounding the cylinder 32 is a printed circuit member 36. Member 36 is preferably a thin T-shaped printed circuit to which receptacle contact heads 48 are secured. The circuit of member 36 is preferably printed on or sandwiched between sheets of a flexible backing such as Kapton TM sheet, a polyimide film sold by DuPont Corp., so that it may curve around cylinder 32. One or more fine wire brush members 50 may be optionally secured to circuit member 36 to conduct static electricity from the inserted key as described hereinafter.

To assemble the receptacle contact heads 48 are inserted through slots 40 in insert members 34. If brush members 50 are included they will fit into the gap between protrusions 46. The insert members are then slid into cylinder 32 with the contact head leads 55 passing through the longitudinal slots in cylinder 32 formed between opposing pairs of fingers 33. When this is accomplished, circuit member 36 will partially surround the cylinder 32.

As alternatives to circuit member 36, a semicylindrical circuit member which is sufficiently flexible to move with contact heads 48 or individual flexible connectors may be secured to the contact heads.

In the preferred embodiment the rear most set of fingers 33*b* will not contain any contact heads centered therebetween. In such case fingers 33*b* may be used as a gluing or welding surface to permanently secure members 34 to cylinder 32. Alternatively, fingers 33*b* may be strapped together to form a solid ring member or a solid ring member may be molded on the end of the finger spring cylinder means 32 instead of fingers 33*b*. Such a ring member will contain the rear keyway geometry and provide a solid surface to which members 34 may be secured.

If a strap is used to connect fingers 33*b* or cylinder 32 is provided with a solid ring at the rear thereof, the receptacle interior assembly of inserts 34, cylinder 32 and circuit member 36 may be accomplished by sliding inserts 34 into cylinder 32 until slots 40 each come into alignment with a groove between finger springs 33. Circuit member 36 may then be wrapped around cylinder 32 with heads 48 extending through the grooves between fingers 33 and through slots 40. Members 34 may then be further slid into cylinder 32 so that slots 40 and contact heads 48 carried therein are centered on finger springs 33 as shown in FIG. 7.

To complete assembly, cup-like outer body member 30 is slid over the printed circuit and sonic welded to the back side of the receptacle face. Tail portion 52 of the printed circuit emerges from the receptacle by means of curved slot 54 in the rear of outer body 30. Connection of the receptacle to the computer or other control circuit may be made by means of tail member 52.

Outer body member 30 preferably contains a threaded portion 58 whereby the receptacle may be easily secured to a general surface such as a computer control panel.

The mechanism of operation of the receptacle is best illustrated in FIGS. 9–12. When the key is inserted the detents 44 cooperate with the keyway opening 22 in the face of the receptacle to provide insertion guide means, minimizing twisting of the key during insertion so as to prevent damage to key or keyway contacts. When the key is fully inserted it may be rotated to bring key contact 16 into engagement with receptacle contact heads 48. As the key is rotated from the insertion position to the contacting or "locked" position, pressure on detent members 44 displaces fingers 33*a* outwardly as shown in FIG. 11 so that the key may pass by the detent members. As shown in FIG. 12 when the key reaches the contacting position fingers 33*a* snap back to the rest position. Detents 44 now hold the key in the contacting position until sufficient angular force is applied to the key to again displace detents 44 allowing the key to return to the insert position.

While the preferred embodient includes four detents 44, it can be seen from FIGS. 9, 11 and 12 that two detents on the same semicircular section, eg., on each member of an opposing pair of finger springs or on a pair of finger springs extending from opposite sides of a spine member 39, will provide the same locking action, although with reduced effectiveness. Additionally, if the keyway is provided with appropriate stop means for preventing rotation of the key in one direction, a single detent, or two diametrically opposed detents, in the remaining key rotation path could be used.

Figure 6:
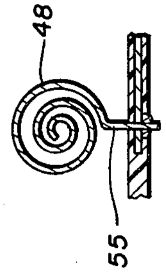
FIG. 6 is a sectional view of a preferred contact head taken along line 6—6 of FIG. 5.
Figure 10:
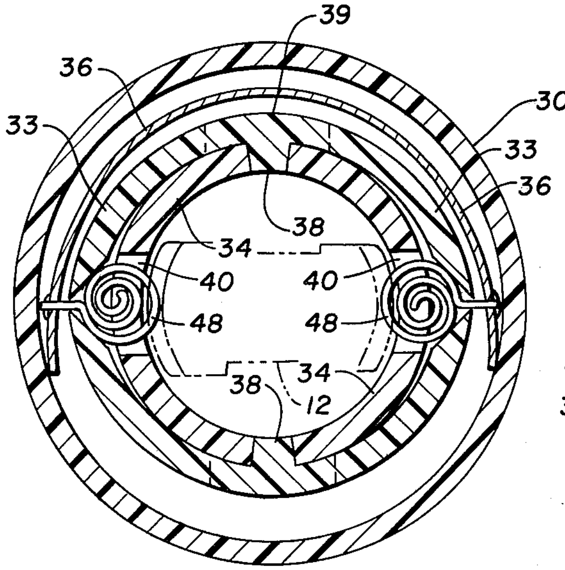
FIG. 10 is a view as in FIG. 8 but with a key inserted and rotated to the locked position.

When the key is in the locked or contacting position the receptacle contact heads are forced slightly outwardly also displacing finger members 33 outwardly. If the contact heads 48 are in the form of a helical spring as shown in FIGS. 6 and 10, some of the outward displacement may also be absorbed by the spring. Contact heads 48 may alternatively be in the form of solid or other spring designs. Outward displacement of finger members 33 produces an inwardly directed force against the contact heads so that electrical contact with the key contacts may be maintained. Fingers 33 provide a sturdy structure which can maintain contact between the receptacle and the key even after repeated insertions and rotations of the key.

To remove potentially interferring static electricity from the key surfaces, the receptacle may be provided with optional fine wire brush members 50 which are connected to ground. These brushes engage the sides of the key during insertion thereof, thereby removing static buildup on such surfaces. As the key is rotated the brush will be deflected into unused key grooves 18*a*.

Figure 13:
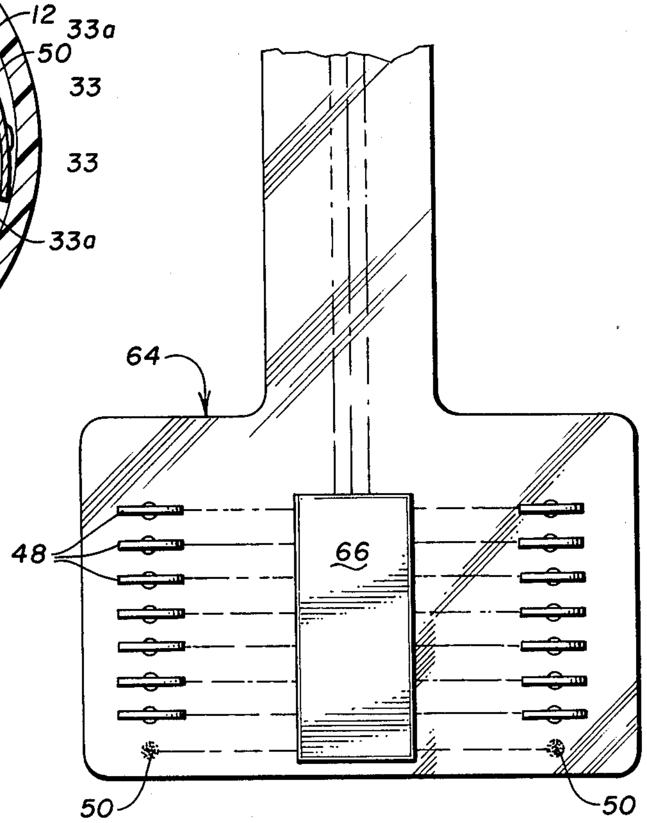
FIG. 13 is a plan view of an alternate flexible circuit including a control circuit or computer thereon.

In some applications the control circuit to which the receptacle is connected may be located directly on the flexible circuit member within the receptacle enclosure 30. A modified flexible circuit 64 is shown in FIG. 13. The control circuit or computer 66 is located on the circuit member 64. In this modification, the only necessary leads exiting the receptacle via slot 64 are for power, ground and computer output.

I claim:

1. A receptacle defining a keyway for an insert portion of a key-like device having an inserted and a "locked" position within the receptacle, the key-like device further having a plurality of spaced transverse grooves on said insert portion and containing an electrical element embedded therein, the element including a plurality of electrical leads each of which is carried on the surface of one of each of said grooves, the receptacle comprising:

- a plurality of spaced electrically conductive contact heads protruding into said keyway and positioned therein for contacting a correspondingly spaced key lead upon insertion of said key insert portion into the receptacle and rotation of the key to the "locked" position;
- finger spring cylinder means surrounding said keyway and including a plurality of arcuate finger spring members so as to form a cylinder-like structure of opposing finger spring pairs, the ends of each finger spring pair being positioned in supporting engagement with one each of said contact heads and the contact heads being arranged in the keyway such that the contact heads are displaced outwardly and urge the supporting finger spring pairs radially outwardly when the key is rotated to the "locked" position; and,
- electrical connection means for connecting said receptacle to an operating electrical circuit.

2. A receptacle as in claim 1 wherein said finger spring cylinder means further includes a pair of diametrically opposed spine members, said arcuate finger spring members extending from both sides of each of said spine members so as to form the cylinder-like structure of opposing finger spring pairs.

3. A receptacle as in claim 1 wherein the electrical connection means includes a flexible circuit member partially surrounding said finger spring cylinder and means for providing electrical connection between said flexible circuit and said receptacle contact heads.

4. A receptacle as in claim 3 wherein said operating electrical circuit is a control circuit included within the receptacle on said flexible circuit member.

5. A receptacle as in claim 3 wherein said means for providing electrical connection between the flexible circuit and the receptacle contact heads is a plurality of conductive lead members each extending from one said contact head to said flexible circuit and passing between the opposing finger-like spring member supporting said contact head.

6. A receptacle as in claim 1, 2 or 3 wherein at least one of said finger springs contains on an intermediate portion thereof a detent protruding into said keyway.

7. A receptacle as in claim 6 having four detented fingers, one said detented finger extending from each side of each spine.

8. A receptacle as in claim 1, wherein the receptacle has a front end wall with a keyway opening therein, the keyway opening of the receptacle shaped to cooperate with two opposing "guide" grooves in the insert portion of the key to comprise withdrawal prevention and rotation guiding means for preventing withdrawal of the key when the key is rotated and for guiding the key during rotation to the "locked" position so as to bring the correspondingly spaced insert and keyway contact together in contacting pairs.

9. A receptacle as in claim 1 further comprising at least one grounded fine wire brush member positioned in said keyway for contacting said key along a non-conductive side thereof during insertion of the key into the receptacle whereby static electricity may be removed from the non-conductive sides of the key.

10. A receptacle as in claim 1 wherein said contact heads are helical spring members.

11. A receptacle as in claim 1 wherein said contact heads are solid members.

* * * * *

UNITED STATES PATENT AND TRADEMARK OFFICE

CERTIFICATE OF CORRECTION

PATENT NO. : 4,379,966

DATED : April 12, 1983

INVENTOR(S) : William P. Flies

It is certified that error appears in the above-identified patent and that said Letters Patent are hereby corrected as shown below:

Column 1, line 19, the word appearing as "or" after "electrical system," should be --as--.

Signed and Sealed this

Ninth Day of August 1983

[SEAL]

*Attest:*

GERALD J. MOSSINGHOFF

*Attesting Officer* *Commissioner of Patents and Trademarks*